United States Patent [19]
Wiggins

[11] Patent Number: 6,149,286
[45] Date of Patent: Nov. 21, 2000

[54] LASER FISHING ROD

[76] Inventor: Wylie E. Wiggins, 30122 Niguel Rd. (Apt. 246), Laguna Niguel, Calif. 92677

[21] Appl. No.: 09/314,866

[22] Filed: May 19, 1999

[51] Int. Cl.[7] .............................. F21K 7/00; A01K 87/00
[52] U.S. Cl. ........................ 362/259; 362/120; 362/553; 43/17.5; 43/22
[58] Field of Search ...................... 43/17.5, 22; 362/553, 362/120, 259, 253

[56] References Cited

U.S. PATENT DOCUMENTS

| | | | |
|---|---|---|---|
| 3,732,644 | 5/1973 | Kavanagh | 43/22 |
| 4,369,486 | 1/1983 | Pool | 362/32 |
| 5,555,667 | 9/1996 | Bae et al. | 43/17 |
| 5,826,366 | 10/1998 | Matibe | 43/17.5 |

*Primary Examiner*—Stephen Husar
*Attorney, Agent, or Firm*—Richard E. Bee

[57] ABSTRACT

A laser illuminated fishing rod is provided for making it easier to fish at night. This laser fishing rod includes a hollow pole for supporting a fishing line and having a handle end and a tip end. A hollow handle structure adapted for manual gripping by a fisherman is affixed to the handle end of the pole. A laser beam producing unit is located within the handle structure and is aligned to transmit a laser beam into the hollow interior of the pole in the direction of the tip end of the pole. This laser beam causes the pole to glow in a brilliant and highly noticeable manner. The pole illumination is very sensitive to movement or flexing of the pole. Even a slight flexing of the pole causes a shimmering or rippling effect in the illumination. This provides a readily visible indication at night that a fish is attempting to take the bait. A unique adjustment mechanism for balancing the weight of the fishing rod is also provided.

20 Claims, 2 Drawing Sheets

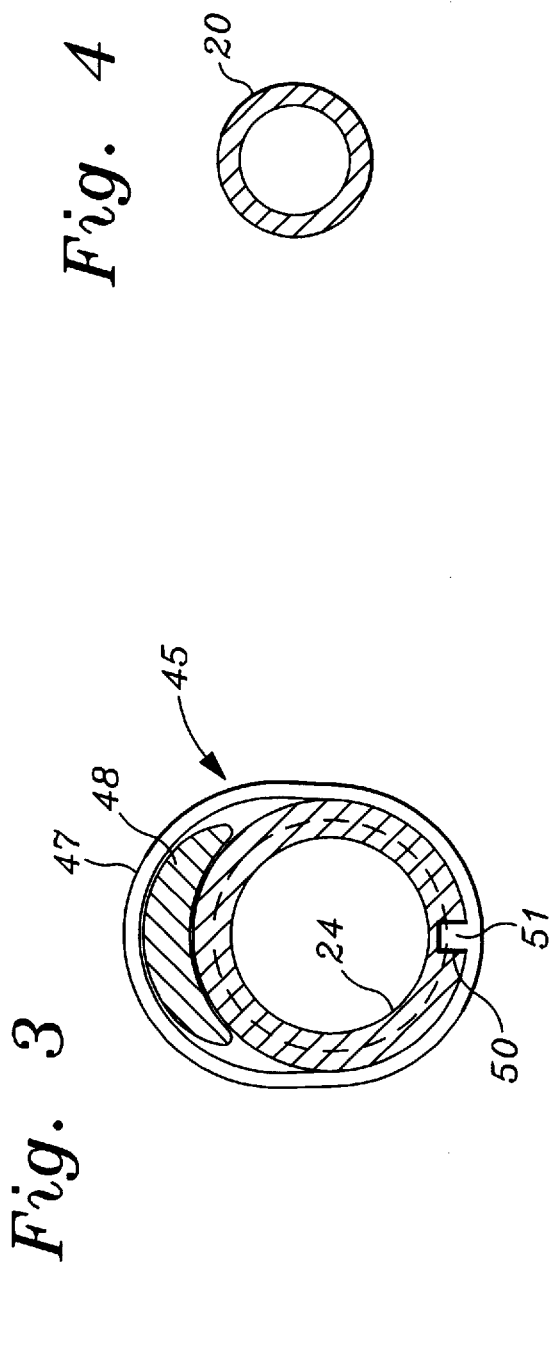
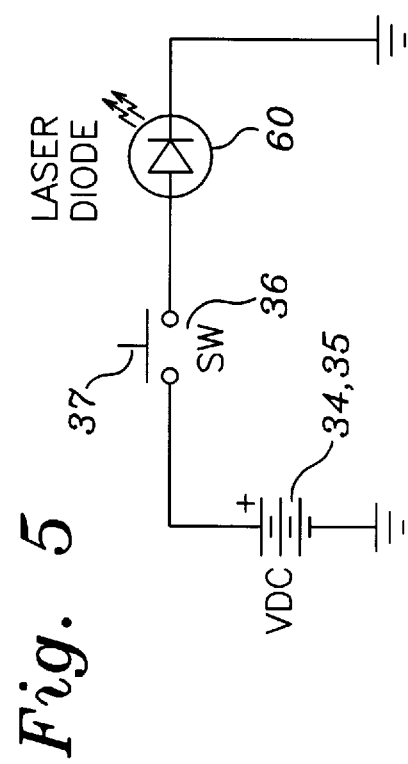

LASER FISHING ROD

TECHNICAL FIELD

This invention relates to fishing rods and, in particular, to lighted fishing rods for fishing in the dark.

BACKGROUND OF THE INVENTION

It is known that many species of fish are more active at dawn or dusk or at night or other times when lighting conditions are poor. Thus, fishing is frequently better during these periods and many people prefer to fish at these times. Because of the darkness, however, it is more difficult to see the end of the rod. This makes it harder, if not impossible, to observe the movement of the end of the rod when a fish is attempting to take the bait.

Various forms of lighted or illuminated fishing rods have been heretofore proposed for solving this problem. U.S. Pat. No. 5,172,508 issued to Mark O. Schmidt et al, for example, describes the use of a removable flashlight unit in the handle of a fishing rod for illuminating the ends of fiber optic cables running up the hollow interior of the fishing pole. U.S. Pat. No. 5,357,410 issued to Michael J. Cota et al describes the use of a light bulb located in an outer section of a fishing pole and connected to a mercury switch located at the tip of the pole for detecting jerking movement of the end of the pole. When the mercury switch detects movement, the light bulb is turned on to light up the outer section of the pole. U.S. Pat. No. 5,738,433 issued to Kevin D. Sparks describes the use of a light bulb in the handle for illuminating a bundle of optical fibers extending up the hollow interior of the pole. The light bulb is connected in circuit with a sensor switch located at the tip end of the pole so that the light bulb is turned on when a fish strikes at the bait.

These previous proposals are interesting, but have various limitations and disadvantages. With the arrangement of Schmidt et al, the light bulb is continuously lit when the pole is in use and the flashlight batteries are soon exhausted. The Cota et al and Sparks fishing rods, on the other hand, use movement sensors which are not very sensitive. Rather substantial movements are required to light the light bulbs. Also, the sudden lighting of the bulb is likely to startle the fish and scare him off. Furthermore, since the poles are not continuously illuminated, these arrangements are not much help in seeing the poles when they have been set aside for one reason or another or when they have been accidentally dropped into the water.

SUMMARY OF THE INVENTION

The present invention provides a fishing rod having a much better method of illuminating the pole. In particular, a fishing rod constructed in accordance with the present invention comprises a hollow pole for supporting a fishing line, such pole having a handle end and a tip end. A hollow handle structure is affixed to the handle end of the pole and is adapted for manual gripping by a fisherman. A laser beam producing unit is located within the handle structure and aligned to transmit a laser beam into the hollow interior of the pole in the direction of the tip end of the pole.

The laser beam causes the pole to glow in a brilliant and highly noticeable manner and is very sensitive to movement or flexing of the pole. Even a slight flexing of the pole causes a shimmering effect in the illumination and provides a visible indication when a fish attempts to take the bait. Also, the laser beam producing unit consumes very little electrical energy and can remain in continuous operation for several days on one set of batteries.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings:

FIG. 3 is an enlarged cross-sectional view taken along section line 3—3 of FIG. 1;

FIG. 4 is an enlarged cross-sectional view taken section line 4—4 of FIG. 1; and FIG. 5 is a schematic electrical circuit diagram showing the electrical connections for the various components of the laser fishing rod of FIG. 1.

DETAILED DESCRIPTION OF THE ILLUSTRATED EMBODIMENT

Figure 1:
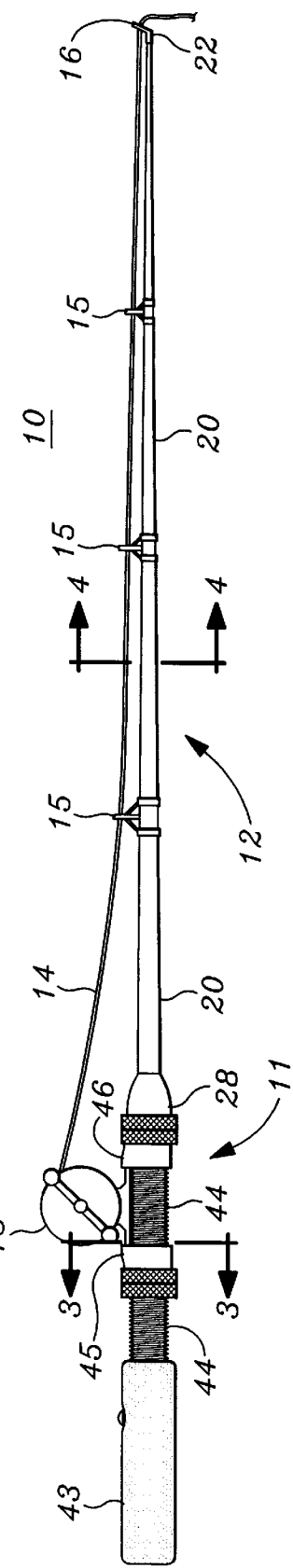
FIG. 1 is a side elevational view of a representative embodiment of a laser fishing rod constructed in accordance with the present invention.

Referring to FIG. 1, there is shown a fishing rod 10 having a handle portion 11, a pole portion 12 and a fishing line reel 13 mounted on the handle portion 11. A fishing line 14 extends from the reel 13 and through a series of line guide eyelets 15 and a final eyelet 16 located at the tip end of the pole. A fish hook (not shown) is attached to the free end of line 14 dangling from the tip end of the pole.

Figure 2:
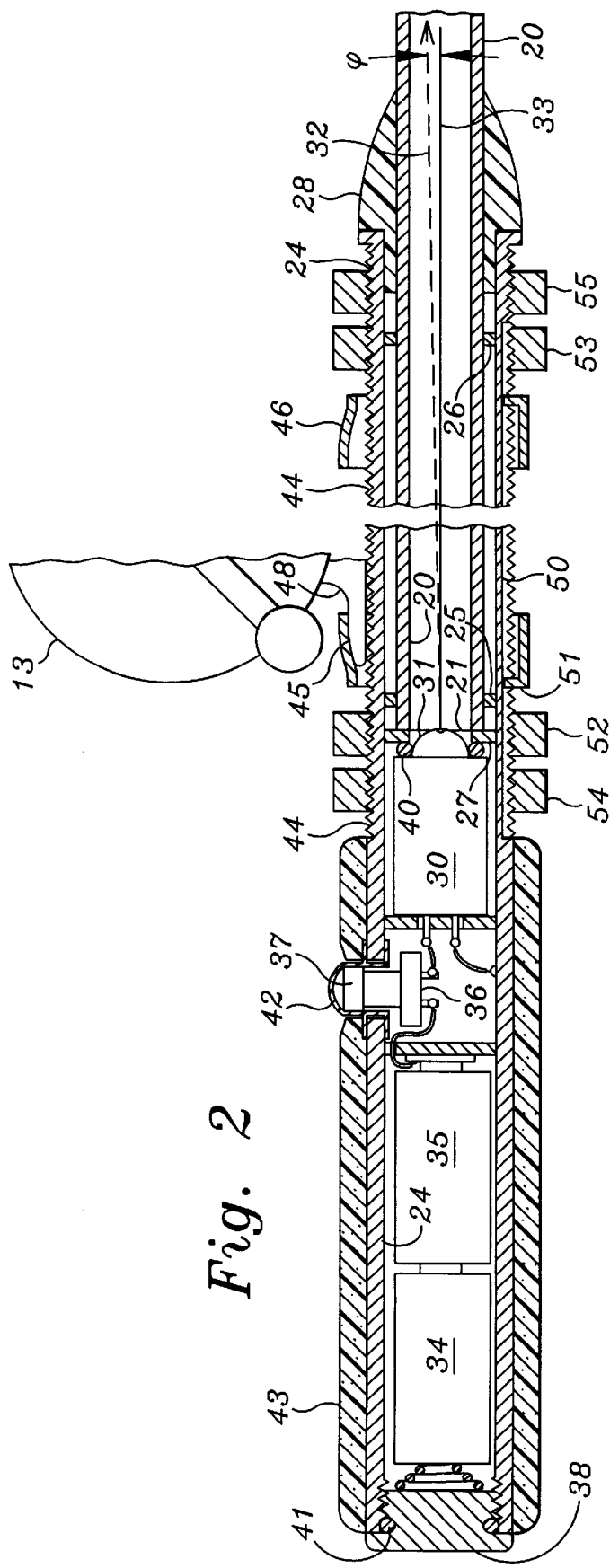
FIG. 2 is an enlarged elevational cross-section of the handle portion of the laser fishing rod of FIG. 1.

The pole portion 12 includes a flexible hollow pole 20 for supporting the fishing line 14, such pole 20 having an open handle end 21 lodged inside the handle portion 11, as shown in FIG. 2, and a closed tip end 22 located at the opposite end of pole 20. The cross-sectional view of FIG. 4 clearly shows the hollow nature of the pole 20. Pole 20 is made of a translucent or transparent plastic material, such as a translucent or transparent fiberglass material.

The fishing rod 10 also includes a hollow handle structure 11 affixed to the handle end 21 of the pole 20. Such handle structure 11 is adapted for manual gripping by a fisherman and includes a hollow cylindrical metal handle member 24 which runs the length of the handle structure 11 and provides the main housing of the handle structure 11. This handle member 24 may be made of hardened aluminum material.

As shown in FIG. 2, the handle end of pole 20 is inserted a substantial distance into the open forward end of the handle member 24 and is secured therein by annular support rings 25 and 26 which are glued to the inner wall of handle member 24. The open end 21 of pole 20 rests on an annular shoulder 27 which is formed in or secured to the inner wall of handle member 24. An annular nosepiece 28 of resilient material such as rubber fits around the exterior of the pole 20 and has a reduced diameter portion which extends into the interior of the handle member 20. Nosepiece 28 keeps the pole 20 from being damaged be the end of the metal handle member 24 as the pole 20 flexes back and forth.

The fishing rod 10 further includes a laser beam producing unit 30 located within the handle member 24 with the beam-emitting end 31 of the laser unit 30 positioned adjacent the open end 21 of the pole 20. The laser unit 30 is aligned to transmit a laser beam 32 into the hollow interior of the pole 20 substantially in line with the longitudinal center axis 33 of pole 20. For maximum effectiveness, the angle φ between the laser beam 32 and the pole center axis 33 should not exceed 0.5 degrees. A very slight angle of less than 0.5 degrees is desirable in order to promote some reflection of the beam off of the inner surface of pole 20. The frailties of manufacture will usually insure that φ is not precisely zero degrees.

The laser beam producing unit 30 includes a laser diode located inside the unit for producing the laser beam 32. This beam is a narrow beam of monochromatic radiant energy. A suitable laser beam producing unit is the Model CL2005 Laser Pointer unit marketed by Clearline Concepts of Boonton, N.J. This is a small compact cylindrical unit which is ideally suited for use in a fishing rod handle. It produces a beam of monochromatic red light having a nominal wavelength of 650 nanometers and requires an operating voltage of only 3.0 volts d.c. Also, its rate of power consumption is very small and two AA batteries are sufficient for continuous operation of the unit for several days.

The fishing rod 10 also includes an electric battery source located within the rearward end of the handle member 24 for supplying electrical operating energy to the laser beam producing unit 30. In the present embodiment, this electric battery source takes the form of a pair of AA size dry cell batteries 34 and 35 which are operated in series to produce a total direct-current voltage of approximately 3.0 volts.

The fishing rod 10 further includes a switch mechanism 36 located within the handle member 24 for turning on and off the flow of electrical energy from the battery source 34, 35 to the laser beam producing unit 30. This switch mechanism 36 includes a switch setting member 37 located in a lateral passageway through the side of the handle member 24 and exposed for actuation by a person using the fishing rod 10. Switch mechanism 36 may take the form of a micro switch and the switch-setting member 37 may take the form of a push-button member.

A removable metal end cap 38 is threaded into the rear end of the handle member 24 for closing this end of handle member 24.

The fishing rod 10 also includes moisture-resistant sealing members for preventing entry of moisture into the interior portion of the handle member 24 in which are located the electrical components, namely, the laser beam producing unit 30, the batteries 34 and 35 and the switch mechanism 36. These sealing members include an O-ring seal 40 located between the beam-emitting nipple 31 and shoulder 27, another O-ring seal 41 located between end cap 38 and handle member 24, and a resilient waterproof membrane 42 covering the switch push-button member 37 and the opening of the lateral passageway in the wall of handle member 24. This membrane 42 has a first annular flap which tucks inside the handle member 24 and a second annular flap which is squeezed between the outside of handle member 24 and a resilient tubular handle cover 43 which slides over the rearward portion of the handle member 24. The handle cover 43 may be made of neoprene or foam rubber or the like.

The fishing rod 10 further includes a unique balance adjustment mechanism for balancing the weight of the fishing rod to improve the feel of the rod in the hand of the fisherman. This balance adjustment mechanism includes structure for enabling adjustment of the longitudinal position of the fishing line reel 13 on the handle member 24. This structure includes circumferential threads 44 which are formed on the exterior of a forward section of the handle member 24. A pair of reel mounting loops 45 and 46 are slidably mounted on the threaded section 44 of the handle member 24 for securing the reel 13 to the handle member 24. A raised collar portion of each mounting loop slides over a foot portion on the base of the reel structure to hold the reel 13 in place. As shown in FIG. 3 for rearward mounting loop 45, a raised collar portion 47 slides over a foot portion 48 of the reel base. A longitudinally-extending slot 50 in the underside of handle member 24 is provided for receiving an inwardly-extending key tab 51 on mounting loop 45. This prevents rotation of the mounting loop 45 around the handle member 24. The forward mounting loop 46 is constructed in this same manner, but is mounted in a reverse manner so that the larger opening of the raised collar portion faces in a rearward direction for receiving the front foot of the reel base.

A pair of internally-threaded retaining rings 52 and 53 are threaded onto the threaded portion 44 of handle member 24, with the ring 53 positioned in front of the forward reel mounting loop 46 and the other ring 52 positioned in back of the rearward reel mounting loop 45. With the fishing line reel 13 in place, retaining rings 52 and 53 are advanced in opposite directions toward their respective mounting loops 45 and 46 so as to push the mounting loops onto the support feet of the reel base and to retain the mounting loops snugly in place on such support feet. Adjustment of the longitudinal position of the reel 13 is accomplished by loosening the appropriate retaining ring, shifting the reel toward the loosened ring and then advancing the other retaining ring to lock the reel in the new position. The longitudinal position of reel 13 is adjusted until the fishing rod 10 has the balance desired by the fisherman.

A pair of internally-threaded locking rings 54 and 55 are threaded onto the handle member 24 for jamming against retaining rings 52 and 53, respectively, for making sure the retaining rings 52 and 53 don't come loose after they are tightened in place against the reel support base.

FIG. 5 shows a schematic wiring diagram for the electrical components inside the handle member 24. As shown in FIG. 5, batteries 34 and 35, switch mechanism 36 and laser diode 60 (located inside laser unit 30) are connected in a series circuit relationship. Thus, switch 36, which is a two-position switch controls the flow of current from batteries 34 and 35 to the laser diode 60. In a closed switch position, current flows through the laser diode 60 and a laser beam is produced. Conversely, in an open switch position, no current flows and no laser beam is produced.

The laser beam 32 causes the pole 20 to glow in a brilliant and highly noticeable manner. For the case of a laser which emits laser light having a wavelength of 650 nanometers, the pole 20 glows with a bright red color which is clearly visible for a considerable distance at night. The laser illuminated pole is also very sensitive to movement or flexing of the pole. Even a slight flexing of the pole causes a shimmering or rippling effect in the illumination. This provides a very visible indication that a fish is attempting to take the bait.

A further advantage is the very low rate of electrical power consumption by the laser beam producing unit 30. This means that the pole 20 can remain illuminated for very long periods of time, even several days, without fear of wearing out the batteries. Thus, the pole can be left on for the entire fishing session. This makes it easier to locate the pole when it is not being used or when it is accidentally dropped into the water at night.

While there has been described what is at present considered to be a preferred embodiment of this invention, it will be obvious to those skilled in the art that various changes and modifications may be made therein without departing from the invention and it is, therefore, intended to cover all such changes and modifications as come within the true spirit and scope of the invention.

What is claimed is:

1. A fishing rod comprising:

a hollow pole for supporting a fishing line and having a handle end and a tip end;

hollow handle structure affixed to the handle end of the pole and adapted for manual gripping by a fisherman;

and a laser beam producing unit located within the handle structure and aligned to transmit a laser beam into the hollow interior of the pole in the direction of the tip end thereof.

2. A fishing rod in accordance with claim 1 wherein the hollow pole is made of a translucent material.

3. A fishing rod in accordance with claim 1 wherein the hollow pole is made of a transparent material.

4. A fishing rod in accordance with claim 1 wherein the hollow pole is made of a plastic material.

5. A fishing rod in accordance with claim 1 wherein the hollow pole is made of a fiberglass material.

6. A fishing rod in accordance with claim 1 wherein the hollow handle structure is made of metal material.

7. A fishing rod in accordance with claim 1 wherein the hollow handle structure is made of hardened aluminum material.

8. A fishing rod in accordance with claim 1 wherein the laser beam is transmitted into the hollow interior of the pole substantially in line with the longitudinal center axis of the pole.

9. A fishing rod in accordance with claim 1 wherein the laser beam producing unit includes a laser diode for producing the laser beam and the laser beam is comprised of a beam of monochromatic laser energy.

10. A fishing rod in accordance with claim 1 wherein the laser beam is a beam of monochromatic visible light energy having a red color.

11. A fishing rod in accordance with claim 1 wherein the laser beam is a monochromatic beam of energy having a nominal wavelength of 650 nanometers.

12. A fishing rod comprising:

a hollow cylindrical metal handle member;

a flexible hollow pole of translucent fiberglass material for supporting a fishing line and having an open handle end and a closed tip end, the open handle end being inserted a substantial distance into one end of the metal handle member and secured therein;

a laser beam producing unit located within the metal handle member with the beam-emitting end thereof adjacent the open end of the pole and aligned to transmit a laser beam into the hollow interior of the pole substantially in line with the longitudinal center axis of the pole;

an electric battery source located within the rearward end of the metal handle member for supplying electrical operating energy to the laser beam producing unit;

a switch mechanism located in the metal handle member for turning on and off the flow of electrical energy form the battery source to the laser beam producing unit and having a switch setting member located in a lateral passageway through the side of the handle member and exposed for actuation by the fisherman;

and a removable end cap for closing the rearward end of the metal handle member.

13. A fishing rod in accordance with claim 12 wherein the laser beam producing unit includes a laser diode for producing the laser beam and the laser beam is comprised of a beam of monochromatic light energy.

14. A fishing rod in accordance with claim 12 wherein the electric battery source produces a direct-current output voltage of approximately three volts.

15. A fishing rod in accordance with claim 12 wherein the switch mechanism is a micro switch and the switch-setting member is a push-button member.

16. A fishing rod in accordance with claim 12 and further including a pair of adjustable-position reel mounting members for mounting a fishing line reel on the metal handle member.

17. A fishing rod in accordance with claim 12 and further including moisture-resistant sealing members located at the beam-emitting end of the laser beam producing unit, at the removable end cap and at the lateral passageway for the switch setting member for preventing entry of moisture into the interior portion of the metal handle member in which are located the laser beam producing unit, the electric battery source and the switch mechanism.

18. A fishing rod having a balance adjustment mechanism comprising:

a pole for supporting a fishing line and having a handle end and a tip end;

a handle structure affixed to the handle end of the pole and adapted for manual gripping by a fisherman, such handle structure having circumferential threads formed on the exterior of a forward section thereof;

a pair of reel mounting loops slidably mounted on the threaded forward section of the handle structure for mounting a fishing line reel on the handle structure;

and a pair of internally threaded retaining rings threaded onto the forward section of the handle structure, one in front of the forward reel mounting loop and the other in back of the rearward reel mounting loop for holding the mounting loops snugly in place on a base portion of the fishing line reel, adjustment of the positions of these retaining rings enabling adjustment of the longitudinal position of the fishing line reel on the handle structure for purposes of balancing the weight of the fishing rod to improve the feel of the rod in the hand of the fisherman.

19. A fishing rod in accordance with claim 18 wherein the handle structure, the reel mounting loops and the retaining rings are made of metal material.

20. A fishing rod in accordance with claim 18 wherein the pole and the handle structure are hollow and a laser beam producing unit is located within the handle structure for transmitting a laser beam into the hollow interior of the pole in the direction of the tip end thereof.

* * * * *